UNITED STATES PATENT OFFICE.

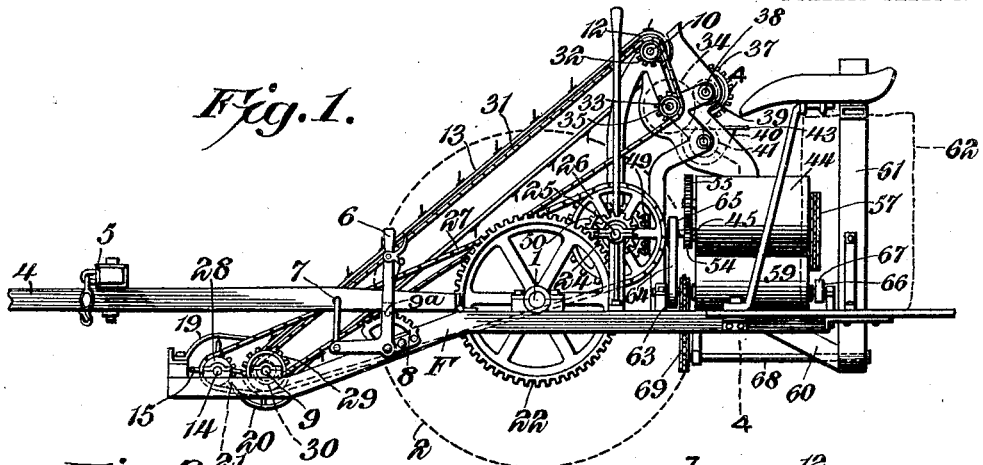

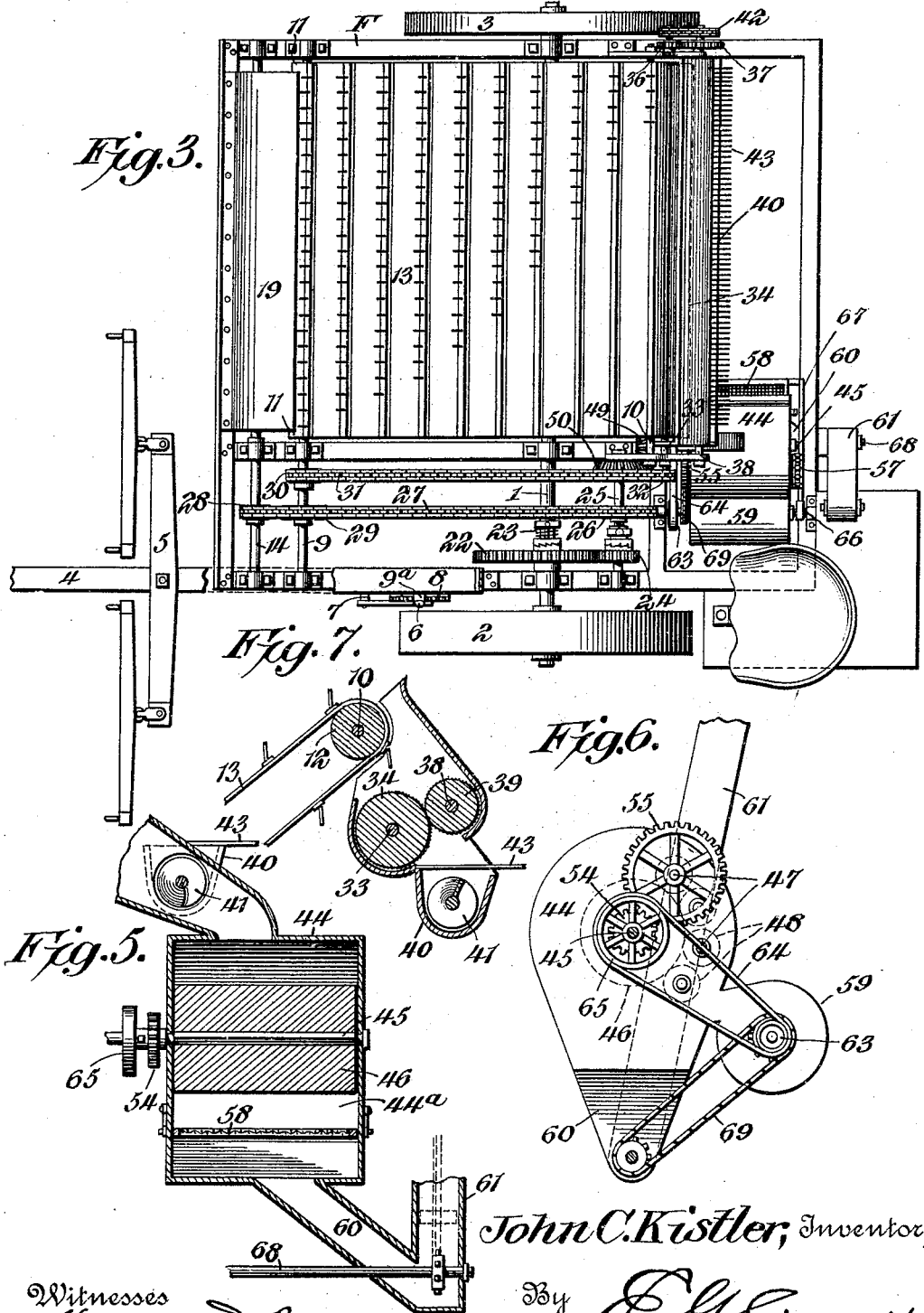

JOHN C. KISTLER, OF CLINTON, MISSOURI.

CLOVER-HULLER.

934,406. Specification of Letters Patent. Patented Sept. 14, 1909.

Original application filed June 17, 1904, Serial No. 213,012. Divided and this application filed March 31, 1906. Serial No. 309,155.

*To all whom it may concern:*

Be it known that I, JOHN C. KISTLER, a citizen of the United States, residing at Clinton, in the county of Henry and State of Missouri, have invented a new and useful Clover-Huller, of which the following is a specification.

The invention relates to clover seed harvesters, and is a division except as to a feature hereinafter referred to of the application, filed by me on June 17, 1904, and eventuating in Patent No. 781,662, dated Feb. 5, 1905.

The object of the present invention is to improve the construction of clover seed harvesters, more especially the means for separating the values from the refuse after the clover heads have been picked.

A further object of the invention is to provide a clover seed harvester of this character adapted to masticate or grind the clover heads, and capable of first separating the heads, straw, and other coarse matter, from the seeds and chaff, and of then removing the chaff from the seeds by delivering the latter to the hulling mechanism.

With these and other objects in view, the invention consists in the construction and novel combination and arrangement of parts, hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a clover seed harvester constructed in accordance with this invention. Fig. 2 is a rear elevation. Fig. 3 is a plan view. Fig. 4 is a transverse sectional view taken substantially on the line 4—4 of Fig. 1. Fig. 5 is a vertical sectional view of the hulling mechanism, taken substantially on the line 5—5 of Fig. 2. Fig. 6 is a detail view illustrating the arrangement of the gearing at the front of the hulling mechanism. Fig. 7 is a detail sectional view, taken substantially on the line 7—7 of Fig. 2.

Like characters of reference designate corresponding parts in all the figures of the drawings.

1 designates a main shaft or axle, journaled in suitable boxes or bearings of the main frame F, and having a transporting and operating wheel 2 fixed to one of its ends, a supporting wheel 3 being provided at the opposite side of the frame, and being loosely arranged on the main shaft or axle 1. Hingedly connected with the main frame is a tongue 4, having means 5 for the attachment of the draft. Means are also provided for adjusting the position of the tongue with relation to the frame, for raising or lowering the picker head, said adjusting means including a bell-crank lever 6, fulcrumed on the frame, a link 7 connecting one arm of the bell-crank lever with the tongue, and a quadrant 8 adapted to be engaged by a spring actuated dog $9^a$, connected with the other arm of the bell-crank lever. The arm, which carries the dog $9^a$, extends upward and serves as a handle or lever for operating the adjusting means to raise or lower the picker head.

The frame F is provided with members, which serve to support boxes or bearings for a pair of shafts 9 and 10, carrying rollers 11 and 12 for supporting an endless apron or carrier 13, and the latter is disposed in an upwardly and rearwardly inclined position. In advance of the shaft 9, which carries the lower front roller 11, is arranged a picker shaft 14, which constitutes the core of a rotary picker-head. The picker-head is provided with sharp pointed teeth or pickers 15, which are placed apart sufficiently for the stalks of grass, grain, or clover, or the like, to enter readily between the teeth, the heads being stripped from the stalks by contact with the edges of the teeth, which are approximately parallel at their inner ends. A curved shield 19 is attached to the frame of the machine in front of the rotary picker-head, to form a protective casing for the picker-head, and also to prevent any waste of seed detached from the straw and carried upwardly and rearwardly by the action of the picking mechanism. Below the front end of the apron or endless carrier 13, is another shield or trough 20, forming a receptacle for such of the heads as are not deposited directly upon the apron by the action of the picker mechanism, and from which said heads may be subsequently removed either manually or by the action of the endless carrier. To the upper front edge of the shield 20 are secured forwardly extending fingers 21, disposed intercurrently with the picker-teeth 15, and serving to remove from the latter any heads or other material, which may have become wedged or lodged between the said picker-teeth.

The main shaft or axle is provided with a spur gear 22, which is normally loose upon the shaft or axle 1, and which is capable of being connected therewith by means of a clutch mechanism 23, capable of disengagement from the spur wheel, to permit the latter to rotate loosely on the shaft, when it is desired to throw the machine out of operation, while by means of such clutch mechanism, the spur gear 22 may be located upon the shaft and caused to partake of the rotary movement of the latter, the spur gear 22 meshes with a pinion 24, mounted upon a shaft 25, located above and in rear of the axle. The shaft 25 carries a sprocket wheel 26, which is connected by means of a chain 27, with smaller sprocket wheels 28 and 29, mounted upon the shafts of the picker and lower apron carrying roller, respectively. The shaft 9 of the lower apron carrying roller, has a sprocket wheel 30, which is connected by a chain 31 with a sprocket wheel 32 upon the shaft 10 of the upper apron carrying roller, to which motion is thus positively transmitted.

Suitably supported below the delivery end of the endless apron or carrier 13, is a shaft 33, carrying a cylinder 34 provided with a rough or rasp-like surface. The shaft 33 has a sprocket wheel 35, which together with the sprocket wheels 30 and 32, is driven by the chain 31. The opposite end of the shaft 33 carries a small pinion 36, meshing with a spur wheel 37 upon a shaft 38, which carries a small cylinder 39 having a rough or rasp-like surface corresponding with that of the cylinder 34. The small cylinder 39 will thus be operated in a direction opposite to that of the large cylinder 34, but the contiguous engaging portions of the surfaces of the cylinders move in the same direction, and owing to the relative diameters of the gears for connecting the said cylinders, the large cylinder is rotated at a much higher speed than the small cylinder. Any relative speed may be obtained by varying the size of the gears, and, in practice, the cylinders will be adjustable toward and from each other to secure the desired engagement with the clover-heads, or other material operated on. The cylinders present tearing or grinding faces to the material, which will be ground or masticated in such manner that the seeds and chaff will become thoroughly separated from the heads, straw, and other coarse material. The upper portion of the large cylinder moves away from the endless carrier or apron, and if desired, the masticating or grinding action may be increased by employing a plurality of small cylinders, which may be arranged so as to form a moving concave, similar to the cylinders of the hulling mechanism, hereinafter described, and which is the feature referred to in the opening paragraph as not constituting a portion of the application, filed June 17, 1904.

Beneath the threshing cylinders is arranged a trough 40, in which a spiral feed-conveyer or screw 41 is mounted for rotation. The trough 40 is of a length equal to the width of the endless apron or carrier, and this feed screw or conveyer may be driven by means of a belt or chain 42 from the shaft 33, which carries the large threshing cylinder. To the front edge of the trough 40 are secured rearwardly extending fingers 43, which coöperate to constitute a sieve or screen, between which the seed and chaff may pass from the threshing cylinders into the trough, the heads, straw and coarse matter being discharged upon the ground in rear of the machine from the rear ends of the fingers 43. The latter are preferably made of elastic or resilient material, such as wire, and, being attached at their front ends only, they will, as the machine progresses, be caused to partake of a jolting or vibratory motion, which greatly assists in separating the values from the refuse.

Supported upon the rear part of the frame of the machine is a casing 44, having bearings for a shaft 45, which carries a hulling cylinder 46. A series of shafts 47 is disposed within the casing in an arc concentric with the shaft 45, and the shafts 47 carry a series of small rough-faced or toothed cylinders 48, which coöperate with the hulling cylinder 46 to hull the seeds which are discharged into the casing from the trough 40, by the action of the spiral feed-screw. Any desired number of small cylinders 48 may be employed, and these cylinders, which are arranged as close to each other and to the hulling cylinder as possible without actual contact, constitute what may be termed, a moving concave for the hulling cylinder 46. The shaft 45 of the latter is provided at its front end with a bevel pinion 49, meshing with a bevel gear 50 upon the end of the shaft 25, and carrying the pinion 24, to which motion is transmitted directly from the spur gear 22 upon the axle of the machine. The shaft 45 of the hulling cylinder 46 carries a small pinion 54, meshing with a spur 55 upon the shaft of one of the small cylinders 48 of the moving concave. The several shafts 47 of the moving concave, are provided at their rear ends with sprocket wheels 56, all of which are connected by a chain 57, so that the cylinders of the moving concave will rotate in the same direction, which is opposite to the direction of rotation of the hulling cylinder. However, the contiguous portions of the hulling cylinder and the cylinders of the moving concave move in the same direction but at different rates of speed, the cylinders of the moving concave traveling at a much lower speed than the hulling cylinder, whereby the seeds will be thoroughly hulled.

The casing 44 contains a sieve or riddle 58, into which the seeds and hulls are dropped as they pass between the hulling cylinder and the cylinders 48 of the moving concave. The seeds passing through the riddle 58 are exposed to the blast from a fan 59, arranged below the casing 44 and serving to discharge the husks and chaff through an opening 44ª, in back of the casing 44, the seeds being discharged through the riddle into a hopper 60, suitably disposed for their reception. The clean seeds pass from the hopper 60 to an elevator 61, at the upper end of which it is discharged into a suitably supported bag or receptacle 62. The fan-shaft is provided at one end with a pulley 63, connected by a belt 64 with a pulley 65 upon the shaft 45 of the hulling cylinder 46. The opposite end of the fan-shaft has an eccentric 66, connected by a strap and connecting rod 67 with the riddle 58, which is hung in such manner as to be capable of being vibrated by the action of the eccentric. The elevator 61, which may be of any desired construction, is provided with an endless carrier or conveyer, having its lower shaft 68 extended in advance of the fan-casing, and connected by sprocket-gearing 69 with the fan-shaft.

The machine, while being designed particularly for harvesting clover seed, may be advantageously employed for harvesting various kinds of grass seed and grain. As the machine progresses over the field, the picker-head is rotated in a direction reverse to the line of progress—that is—the picker-head will be so rotated that the teeth advancing from below will engage and remove the heads from the clover and carry the same in an upward and rearward direction, and deposit the heads upon the endless apron. The heads carried upward by the endless apron or carrier are discharged onto the rasping or threshing cylinders or rollers, whereby the seed and chaff will be thoroughly rubbed out of the heads, the latter and other coarse material being discharged over the screen fingers at the upper edge of the conveyer trough, while the seed passes into the latter and is discharged at one end thereof into the casing of the hulling mechanism, where it is acted upon, until having been cleansed and freed from impurities, it passes to the elevator and is conveyed to the sack or other receptacle prepared for it.

Having thus fully described my invention, what I claim as new and desire to secure by Letters Patent, is:—

1. In a machine of the class described, the combination of an inclined conveyer, a casing located beneath the upper end of the conveyer and extending across the same, threshing means mounted within the casing and coextensive therewith, a trough extending across the machine and arranged beneath the threshing means, a transverse conveyer operating in the trough to carry the material to one side of the machine, and hulling mechanism located at such side of the machine and beneath the adjacent end of the trough and receiving the material from the conveyer.

2. In a machine of the class described, the combination of a conveyer, a casing located beneath the conveyer and open at the top and bottom, a plurality of threshing rolls mounted within the casing, a trough extending across the machine and arranged beneath the said rolls, a conveyer operating in the trough to carry the material to one side of the machine, and hulling mechanism located at such side of the machine and receiving the material from the trough.

3. In a machine of the class described, the combination of a conveyer, threshing rolls arranged to receive the material from the conveyer, a trough extending across the machine and located beneath the rolls, a screeen interposed between the trough and the threshing rolls and arranged to discharge the coarse material over the trough at the rear of the machine, the values passing through the screen into the trough, hulling mechanism located at one side of the machine and connected with one end of the trough, and a conveyer operating within the trough to deliver the material to the hulling mechanism.

4. In a machine of the class described, the combination of a conveyer, a pair of threshing rolls arranged side by side to receive the material from the conveyer, means for rotating the rolls at different speeds, a trough extending across the machine and arranged below the rolls to receive the discharge therefrom, and vibratory resilient fingers connected at their front ends to the trough and having unattached rear ends, said fingers being vibrated by the jolting of the machine in the forward movement thereof and extended over the top of the trough.

5. In a machine of the class described, the combination of a hulling cylinder, a moving concave comprising a plurality of rough faced cylinders of smaller diameter than the hulling cylinder and partially surrounding the latter, said small cylinders being mounted in rigid bearings and arranged as close to each other and to the hulling cylinder as possible without actual contact so as to form a practically continuous unyielding moving concave surface, and means for positively driving the small cylinders in a direction opposite to the direction of the rotation of the hulling cylinder, whereby the contiguous engaging faces of all the cylinders travel in the same direction but at different speeds.

6. In a machine of the class described, the combination of a hulling cylinder, a moving concave comprising a plurality of cylinders of smaller diameter than the hulling cylinder and partially surrounding the latter, said small cylinders being mounted in rigid bearings and arranged as close as possible to each other and to the hulling cylinder without actual contact so as to form a practically continuous unyielding moving concave surface, means for rotating the hulling cylinder, and means for driving the small cylinders in a direction opposite to the rotation of the hulling cylinder and at a slower speed, whereby the contiguous engaging faces of all the cylinders travel in the same direction but at different speeds.

7. In a machine of the class described, the combination of an inclined conveyer, a casing located beneath the upper end of the conveyer and extending entirely across the same, a pair of threshing cylinders of different diameters mounted within the casing and coextensive therewith, said cylinders being driven at different speeds, a trough extending across the machine and arranged beneath the threshing cylinders, a transverse conveyer operating in the trough to carry the material to one side of the machine, and hulling mechanism located at such side of the machine and beneath the adjacent end of the trough and receiving the material from the conveyer.

In testimony, that I claim the foregoing as my own, I have hereto affixed my signature in the presence of two witnesses.

JOHN C. KISTLER.

Witnesses:
  E. E. DIX,
  M. F. WOOD.